(12) United States Patent
Bolton et al.

(10) Patent No.: US 11,751,013 B2
(45) Date of Patent: *Sep. 5, 2023

(54) ADAPTIVE LOCATION BRANDING

(71) Applicant: CollegeNET, Inc., Portland, OR (US)

(72) Inventors: Jeff Michael Bolton, Portland, OR (US); James H. Wolfston, West Linn, OR (US)

(73) Assignee: CollegeNET, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,084

(22) Filed: Dec. 13, 2021

(65) Prior Publication Data

US 2022/0182783 A1 Jun. 9, 2022

Related U.S. Application Data

(63) Continuation of application No. 16/780,884, filed on Feb. 3, 2020, now Pat. No. 11,202,170, which is a
(Continued)

(51) Int. Cl.
*H04W 4/02* (2018.01)
*H04W 4/30* (2018.01)
(Continued)

(52) U.S. Cl.
CPC ............ *H04W 4/025* (2013.01); *H04L 67/02* (2013.01); *H04W 4/30* (2018.02); *H04W 4/38* (2018.02); *H04W 4/80* (2018.02); *H04L 67/53* (2022.05)

(58) Field of Classification Search
CPC ....... H04W 4/00–029; H04W 4/18–38; H04W 4/70; H04W 4/80; H04W 8/08–245;
(Continued)

(56) References Cited

U.S. PATENT DOCUMENTS 7,441,203 B2 10/2008 Othmer et al.
7,450,954 B2 11/2008 Randall
(Continued)

FOREIGN PATENT DOCUMENTS

CA 2635785 A1 7/2007
GB 2425921 A 7/2009
(Continued)

OTHER PUBLICATIONS

Office Action dated Feb. 14, 2023, in corresponding Japanese application No. 2021-204101, filed Nov. 22, 2016, 10 pages.
(Continued)

*Primary Examiner* — San Htun
(74) *Attorney, Agent, or Firm* — CHRISTENSEN O'CONNOR JOHNSON KINDNESS PLLC (57) ABSTRACT

A method and system for providing location-specific information to users, wherein this information is directly maintained and supplied by the provider of the service. This information is supplied by an application running on a personal communication device, where the application is developed and provided by a third-party servicer and the third party servicer makes various program options/APIs of the application available to and selectable by its customers. Other embodiments of the invention provide techniques for changing the appearance and/or functionality of a location aware application on a portable communication device. The method includes capturing or retrieving a digital image of a subject using a portable communications device; analyzing the digital image to determine a subject of the digital image; detecting a location associated with the digital image; and displaying information related to the subject of the digital image and the location associated with the digital image.

15 Claims, 8 Drawing Sheets

Related U.S. Application Data continuation-in-part of application No. 15/876,297, filed on Jan. 22, 2018, now Pat. No. 10,555,121, which is a continuation of application No. 14/949,477, filed on Nov. 23, 2015, now Pat. No. 9,883,344.

(51) Int. Cl.
*H04W 4/80* (2018.01)
*H04L 67/02* (2022.01)
*H04W 4/38* (2018.01)
*H04L 67/53* (2022.01)

(58) Field of Classification Search
CPC ... H04W 88/00–06; H04L 67/02; H04L 67/53
See application file for complete search history.

(56) References Cited

U.S. PATENT DOCUMENTS

| | | |
|---|---|---|
| 7,873,708 B2 | 1/2011 | Durand et al. |
| 8,073,467 B2 | 12/2011 | Gupta et al. |
| 8,099,109 B2 | 1/2012 | Altman et al. |
| 8,214,738 B2 | 7/2012 | Othmer et al. |
| 8,351,923 B2 | 1/2013 | Griff et al. |
| 8,396,485 B2 | 3/2013 | Grainger et al. |
| 8,412,166 B2 | 4/2013 | Ellanti et al. |
| 8,463,247 B2 | 6/2013 | Misiag |
| 8,497,796 B2 | 7/2013 | Shamilian et al. |
| 8,666,436 B2 | 3/2014 | Ellanti et al. |
| 8,668,592 B2 | 3/2014 | Watkins, Jr. et al. |
| 8,682,350 B2 | 3/2014 | Altman et al. |
| 8,738,024 B1 | 5/2014 | Kerr et al. |
| 2002/0161646 A1 | 10/2002 | Gailey et al. |
| 2004/0203768 A1 | 10/2004 | Ylitalo et al. |
| 2004/0203863 A1 | 10/2004 | Huomo |
| 2004/0204063 A1 | 10/2004 | Van Erlach |
| 2005/0245241 A1 | 11/2005 | Durand et al. |
| 2006/0007315 A1 | 1/2006 | Singh |
| 2006/0179127 A1 | 8/2006 | Randall |
| 2006/0236257 A1 | 10/2006 | Othmer et al. |
| 2007/0001904 A1 | 1/2007 | Mendelson |
| 2007/0155489 A1 | 7/2007 | Beckley et al. |
| 2007/0257792 A1 | 11/2007 | Gold |
| 2009/0005080 A1 | 1/2009 | Forstall et al. |
| 2009/0170532 A1 | 7/2009 | Lee et al. |
| 2010/0109864 A1 | 5/2010 | Haartsen et al. |
| 2010/0188279 A1 | 7/2010 | Shamilian et al. |
| 2010/0241507 A1 | 9/2010 | Quinn et al. |
| 2010/0317371 A1 | 12/2010 | Westerinen et al. |
| 2010/0331016 A1 | 12/2010 | Dutton et al. |
| 2011/0052073 A1* | 3/2011 | Wallace .............. G06V 20/39 |
| | | 382/190 |
| 2011/0065451 A1 | 3/2011 | Danado et al. |
| 2011/0070872 A1 | 3/2011 | Ellanti et al. |
| 2011/0082808 A1 | 4/2011 | Beykpour et al. |
| 2011/0105150 A1 | 5/2011 | Moon et al. |
| 2011/0137881 A1 | 6/2011 | Cheng et al. |
| 2011/0165859 A1 | 7/2011 | Wengrovitz |
| 2011/0191432 A1 | 8/2011 | Layson, Jr. |
| 2011/0279311 A1 | 11/2011 | Hamano |
| 2011/0300837 A1 | 12/2011 | Misiag |
| 2012/0130762 A1* | 5/2012 | Gale .................. G06V 20/20 |
| | | 714/49 |
| 2012/0213205 A1 | 8/2012 | Tammisetti |
| 2012/0215617 A1 | 8/2012 | Shah et al. |
| 2012/0220314 A1 | 8/2012 | Altman et al. |
| 2012/0290591 A1* | 11/2012 | Flynn .............. G06F 16/5866 |
| | | 707/754 |
| 2012/0310968 A1* | 12/2012 | Tseng ............. G06F 16/24578 |
| | | 707/769 |
| 2013/0080578 A1 | 3/2013 | Murad et al. |
| 2013/0109412 A1 | 5/2013 | Nguyen et al. |
| 2013/0183924 A1 | 7/2013 | Saigh et al. |
| 2013/0294657 A1 | 11/2013 | Chen |
| 2014/0032437 A1 | 1/2014 | Greenberg |
| 2014/0065965 A1 | 3/2014 | Prasad et al. |
| 2014/0207575 A1 | 7/2014 | Freed-Finnegan et al. |
| 2015/0189070 A1 | 7/2015 | Baker |
| 2015/0296347 A1 | 10/2015 | Roth |
| 2017/0061294 A1* | 3/2017 | Weston ................ G06N 3/045 |

FOREIGN PATENT DOCUMENTS

| | | |
|---|---|---|
| JP | 2001175554 A | 6/2001 |
| JP | 2001318845 A | 11/2001 |
| JP | 2013517543 A | 5/2013 |
| JP | 2013545154 A | 12/2013 |
| JP | 2014048053 A | 3/2014 |
| JP | 2014511521 A | 5/2014 |
| JP | 2015207919 A | 11/2015 |
| WO | 2004008792 A1 | 1/2004 |
| WO | 2010144651 A2 | 12/2010 |
| WO | 2011037769 A1 | 3/2011 |
| WO | 2012/111251 A1 | 1/2012 |

OTHER PUBLICATIONS

Office Action dated Dec. 19, 2022, in corresponding Canadian application No. 3,005,746, filed Nov. 22, 2016, 3 pages.

* cited by examiner

ADAPTIVE LOCATION BRANDING

The present application is a continuation of U.S. patent application Ser. No. 14/949,477, filed on Nov. 23, 2015, which is a continuation-in-part of U.S. patent application Ser. No. 15/876,297 filed on Jan. 22, 2018, which is a continuation of U.S. patent application Ser. No. 14/949,477, filed on Nov. 23, 2015, each of which is hereby incorporated by reference into the present application.

TECHNICAL FIELD OF THE INVENTION

The present invention relates to portable communications devices, and in particular to wireless portable communication devices (e.g., "Smartphones", etc.) running applications having graphic displays.

BACKGROUND OF THE INVENTION

The use of GPS systems for navigation is accepted and commonly used, now almost indispensable, especially for a person navigating unfamiliar places such as a new city, a college campus, etc. More recently, additional functions such as applications ("apps") which will tell the user where to find particular restaurants, or a gas station nearby, etc. have appeared. The information supplied as a result of these searches is not served from databases tended or populated by the suppliers of those services. Instead this third party information (e.g., gas prices, restaurant menu items, campus events) is controlled, compiled, and served from databases managed by a third-party search provider, such as Google.

It may be preferable, for both the service provider and the end-user, that this information be provided instead from databases tended by the service provider (i.e., the restaurant, theater, university, etc.) to ensure that this information is current, complete, and reliable. In addition, third-party searches do not change the appearance and features based on the detected location—i.e., a Google search result will not change the display on a portable communications device to show the Stanford colors and logo, and will not provide the detail of information which Stanford might want to provide a visitor to the Stanford campus.

Thus it would be desirable to configure a location-aware app on a portable communications device that changes its appearance and features based on a detected location.

It would be further desirable that the location can be detected by any known means such as GPS, Wi-Fi, mobile network, Bluetooth, NFC, geo-fencing with beacons, and the like.

SUMMARY OF THE INVENTION

Embodiments of the invention are directed to a location-aware application on a portable communication device that changes its appearance and features based on a detected location. The user may first install the application on his portable communications device and the application may then present a different appearance based on the detected location. The location can be detected by any known means such as, but not limited to, GPS (including, but not limited to, GPS data encoded in exchangeable image file format (Exif)), Wi-Fi, mobile network, Bluetooth, NFC, an iBeacon, geo-fencing with locational beacons, computer-based image recognition, and the like. After the location is detected, location-specific information may go to users through the application displaying this information on the display screen of the portable communication device, wherein this information is from databases controlled by the provider of the local service.

Other embodiments of the invention are directed to an alternative method for changing the appearance and/or functionality of a location-aware application on a portable communication device. The method includes capturing or retrieving a digital image of a subject using a portable communications device; analyzing the digital image to determine a subject of the digital image; detecting a location associated with the digital image; and displaying information related to the subject of the digital image and the location associated with the digital image.

Several exemplary applications of the application are presented, but many other applications are possible within the scope of the invention as will be clear from the descriptions of embodiments provided herein.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention provide for improved methods for providing location-specific information to users, wherein this information comes from databases tended by the provider of the service. In a preferred embodiment, the application is developed and provided by a third-party servicer (e.g., CollegeNET) and the third party servicer makes various program options/APIs of the application available to and selectable by its customers (e.g., various universities). This way, the various universities don't have to develop their own unique applications (and coax users into downloading them) to provide a unique user experience tied to the university, and the users don't have to download an application for each school they visit.

In the following description, the term "location-defining device" as used herein applies to any one or more of the following types of electronic devices that provide location information: the global positioning system (GPS), local area wireless computer networks such as IEEE 802.11(Wi-Fi), mobile cellular network devices, Bluetooth devices, near-field communication (NFC) devices, an iBeacon® from Apple Computer, Inc., a radio-frequency identification (RFID) device, geo-fencing with locational beacons, etc. The term "brand" or "branding information" as used herein refers to any information capable of indicating source, origin, affiliation, or sponsorship of goods or services including, but not limited to, trademarks, service marks, logos, slogans, colors, mascots; banners, crests; seals, emblems, sounds, jingles, fight songs, anthems, and the like. The term "portable communication device" as used herein refers to any signal processing device, data processing system, or computer system adapted for communication of data at least by wireless means and adapted for portability by the user, including, but not limited to, cellular telephones, smartphones, tablet devices, laptop computers, personal digital assistants, and the like. Some portable communications devices are known to include integrated cameras capable of capturing digital images.

The following sections present illustrative examples of applications of embodiments of the invention, however other applications fall within the scope of the invention as may be understood by those skilled in the art.

In a first example of possible applications of embodiments of the invention, a user visits the Harvard campus as detected by proximity to a Harvard-encoded location-defining device, and the application's appearance (i.e., the screen display, or graphic user interface) changes to Harvard branding (school colors, symbols, mascot, mottos, trademarks, background images, etc.) and presents a first set of options to the user that Harvard wants to make available to the user. These options may be determined based on a status of the user (guest, faculty, staff, student, prospective student, parent, donor, etc.), wherein the status may be determined by sign-on credentials to the application. The user then subsequently may visit the Yale campus as detected by proximity to a Yale-encoded location-defining device, and the appearance of the same application changes to Yale branding and presents a second set of options to the user that Yale wants to make available to the user—note that the second set of options offered by Yale may differ from the first set of options offered by Harvard.

A second example of possible applications of embodiments of the invention could be a user visiting a convention hall with many exhibits. In response to being near a first vendor's exhibit (as may be detected by proximity to a first Ikea-encoded location-defining device), the application's appearance changes to the vendor's branding and presents options and/or promotional information to the user that the vendor wants to make available to the user. For example, at an Ikea exhibit, the application may change to blue and yellow colored accents with an Ikea logo in the corner. Upon approaching a second exhibit, such as a Coca Cola exhibit as detected by proximity to a second Coca-Cola-encoded location-defining device, the application may change to red and white colored accents with a Coca Cola logo in the corner. Functionality of the application can change based on the vendor's preferences (e.g., promotional videos, discount offers, online order forms, downloadable product brochures/specifications, etc.). These options may be determined based on a status of the user (employee, attendee, customer, preferred customer, etc.), wherein the status may be determined by sign-on credentials. The user then may approach a third vendor's exhibit as detected by proximity to a third location-defining device, and the appearance of the same application changes to that vendor's branding and presents options to the user that the new vendor wants to make available to the user. A similar use case could be applied to any exhibit hall or environment, such as museums, zoos, nature preserves, art exhibits, historical sites or exhibits, trade shows, etc.

In yet another exemplary application, embodiments of the invention may be used for the scheduling of meeting spaces. As an example, a user may be visiting a campus building with multiple classrooms. The application detects the user's proximity to the building by detecting a signal from a location-defining device and presents to the user schedules for the various classrooms in the building. At a more granular level, the application detects proximity to a particular classroom (e.g., by sensing a local location-defining device near the classroom entry point) and displays the schedule for that particular classroom. Scheduling options may be determined based on a status of the user (guest, faculty, staff, student), wherein the status may be determined by sign-on credentials. For example, faculty may have "write" privileges to schedule time in the classroom, whereas students may only have "read" privileges to see the scheduled classes/events. The same use-case can be applied to an office building with multiple conference/meeting rooms.

In another exemplary application, embodiments of the invention may be used to display location-based information relevant to the determined location of a digital image. For example, a user can use an application on a personal communications device to take a digital image of a location on his or her body, such as the knee. The application can use computer-based image recognition (e.g, deep learning for computer vision, etc.) to determine that subject of the digital image is a body part and the relevant body part shown in the digital image is a knee. The application can then display information to the user that is relevant to knees, such as instructive information related to common knee injuries, specific knee injuries determined from the digital image, or products that promote knee health. To make image recognition easier, the user can select a portion of the image that is relevant to the user's intended subject (e.g., using a finger on a touchscreen to draw an approximate boundary around the portion of the image relevant to the intended subject). The application can use location information to display contact information for medical professionals (physicians, physical therapists, etc.) within a specified distance of the detected location who specialize in treating knees. The application can use location information to display contact information for stores within a specified distance of the detected location that sell products related to knees. The detected location can be a location that is captured and recorded by the application when the digital image is taken. The detected location can be a location determined from metadata recorded in the digital image file. The detected location can be determined from any location-defining device.

The application can include branding information indicating that the application is a health care application. The application can change its branding information based on a selection made by the user. For example, if a user took a picture of his or her knee, the application can display a list or menu of items related to knees. The user can navigate the list or menu and select a particular item, such as a knee brace. In response to the user selecting the list item associated with a knee brace, the application can display a list of stores within a specified distance of the detected location that sell knee braces. In response to the user selecting a particular store that sells knee braces, the branding information of the application can change display branding information associated with the selected store.

In another example, a user can use the application on the personal communications device to take a digital image of an automobile engine part. The application can use computer-based image recognition (e.g, deep learning for computer vision, etc.) to determine that the subject of the digital image is an automobile engine part and the relevant automobile engine part shown in the digital image is an alternator. The application can display information to the user that is relevant to alternators, such as descriptions of what the part does how the part works and instructional videos for repairing or replacing the part. To make image recognition easier, the user can select a portion of the image that is relevant to the user's intended subject (e.g., using a finger on a touchscreen to draw an approximate boundary around the portion of the image that is relevant to the intended subject). The application can use location information to display contact information for automobile mechanics or repair shops within a specified distance of the detected location that specialize in diagnosing and repairing alternator problems. The application can use location information to display contact information for auto-part stores within a specified distance of the detected location that sell alternators. The detected location can be a location that is captured and recorded by the application when the digital image is taken. The detected location can be a location determined from metadata recorded in the digital image file. The detected location can be determined from any location-defining device.

The application can include branding information indicating that the application is an automotive repair and maintenance application. The application can change its branding information based on a selection made by the user. For example, if a user took a picture of an alternator, the application can display a list or menu of items related to alternators. The user can navigate the list or menu and select a menu item for "Part Stores." In response to the user selecting the list item associated with "Part Stores," the application can display a list of part stores within a specified distance of the detected location that sell alternators. In response to the user selecting a particular store that sells alternators, the branding information of the application can change display branding information associated with the selected store.

Figure 1:
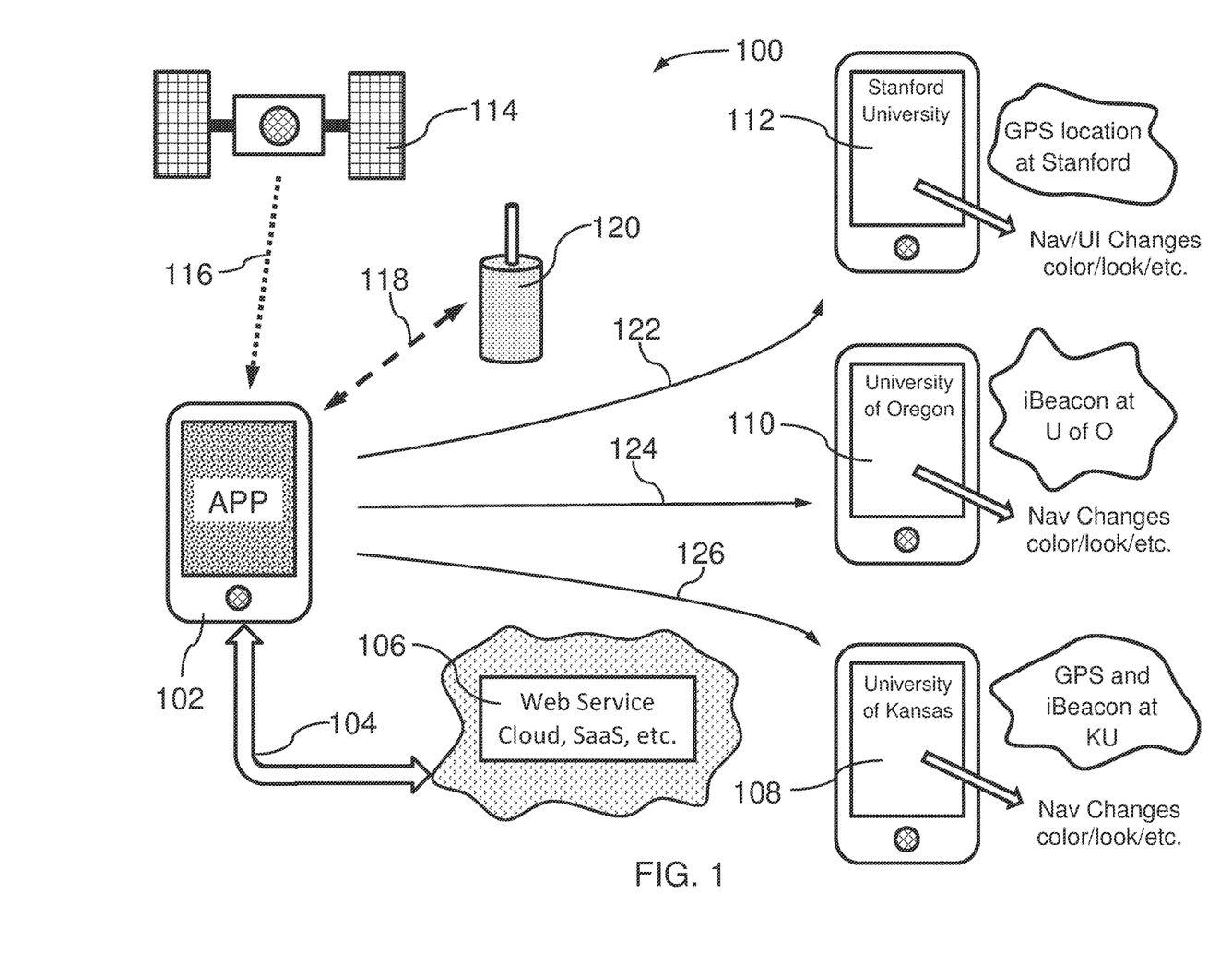
FIG. 1 shows a schematic diagram of the operation of a portable communications device comprising embodiments of the invention in several university environments.

FIG. 1 shows a schematic diagram 100 of the operation of an application according to embodiments of the invention in a portable communications device 102 according to embodiments of the invention operating in several university environments, similar to the first application described briefly above. Location information from an exemplary location-defining device 120, such as GPS, Wi-Fi, mobile network, Bluetooth, NFC, an iBeacon, geo-fencing with locational beacons, etc. is detected 118 by the an application according to embodiments of the invention, running in portable communications device 102.

Location information can also be determined from digital images captured by a camera of the portable communications device 102. Digital image files are known to include metadata (e.g., geotags) that identify the location of the portable communications device at the time the digital image was captured. The metadata can be obtained from a GPS receiver in the camera or the portable communications device and is recorded in the digital image file. The metadata can be used as an indication of the location of the subject matter included in the digital image. Geotags are included, for example, in the Exchangeable image file format (Exif) specification of the Japan Electronic Industries Development Association (JEIDA) that indicate the precise latitude and longitude of the camera when the digital image was captured.

Alternatively, computer-based image recognition of the digital image itself can be used to determine location information. For example, deep learning for computer vision can be used to determine that an image taken by the portable communications device is in a particular location. For example, computer vision can be used to determined that an image taken by the portable communications device is of a building located on the campus of Stanford University. Based on the location determined from the image recognition of the digital image taken by the portable communications device, it can be determined that the portable communications device is located on the campus of Stanford University.

Once the approximate location of the personal communications device 102 has been determined by location information provided by location-defining device 120, or by a digital image, and/or by locational information obtained 116 from the GPS system 114, the application interrogates the web service operating in the cloud in a software-as-a-service mode to obtain information to be provided and displayed for the user according to pre-determined choices by the controlling institution (i.e., the organization which provided and programmed the location data on the location-defining device).

In the example 112, if portable communications device 102 senses that it is on the Stanford University campus from the GPS signal, the application 122 will change various attributes of the display on the portable communications device 102, such as the color (to Stanford University color, cardinal red), logos, display options, etc. Similarly, if the portable communications device 102 detects a University of Oregon (U of O)-encoded location-defining device, the application 110 determines that it is on the U of O campus, and may change 124 various attributes of the display on the portable communications device 102, such as the colors (to U of O colors, green and yellow), logos, display options, etc. Finally, in a third case where both a University of Kansas (KU)-encoded location-defining device and the GPS signal both indicate that the portable communications device 102 is on the KU campus, the application may change 126 various attributes of the display on the portable communications device 102, such as the colors (to KU colors, crimson and blue), logos, display options, etc. As described in the first exemplary application above, the specific changes may depend on the pre-defined status of the user of the portable communications device, for example depending on whether they are a guest, faculty, staff, student, prospective student, parent, donor, etc.

Figure 2:
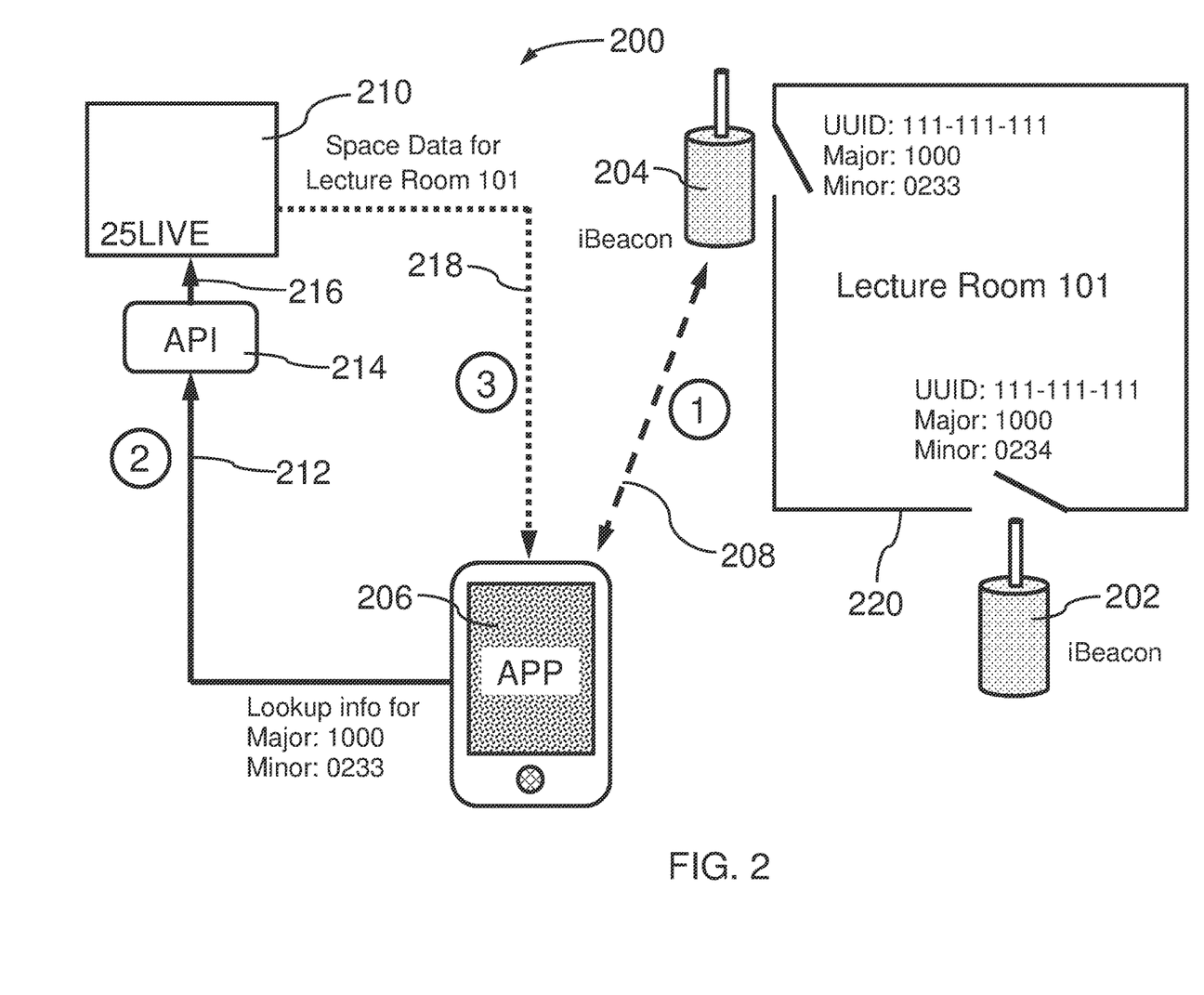
FIG. 2 shows a schematic diagram of the operation of a portable communications device comprising embodiments of the invention in a lecture room locating situation.

FIG. 2 shows a schematic diagram 200 of the operation of an application according to embodiments of the invention in a portable communications device 206 in a lecture room 220 locating situation, similar to the third application described briefly above. A locational signal from an exemplary location-defining device 204, such as an iBeacon as shown here, is detected 208 by the application according to embodiments of the invention, running in portable communications device 206. In this particular example, the locational information comprises a Major coordinate with the value "1000" (denoting the lecture room #101, 220) and a Minor coordinate with the value "0233" (denoting the particular door into lecture room #101—in cases where lecture room #101 may be subdivided by curtains or movable dividing walls, etc., the Minor coordinates for lecture room #101 could denote specific smaller meeting spaces within lecture room 101, each entered through a separate door as shown. Once the approximate location of the device 206 has been determined, the application interrogates 212 the 25Live 210 software-as-a-service (SaaS) through the API 214 linkage 216. The 25Live system then responds 218 by transmitting space data for lecture room 101 to device 206. This space data may include the current assignment of lecture room (as entered through door 0233, in cases where lecture room 101 has been subdivided into individual spaces each entered through separate doors). For example, if iBeacon 202 were interrogated, space data for lecture room #101 would also be provided by the 25Live system, but with possible differences relating to the (possible) room subdivision with separate allocations for the subdivided spaces. In cases where lecture room #131 is not subdivided, the space data provided for both Major: 1000/Minor: 0233 and for major: 1000/Minor: 0234 could be the same.

Figure 3:
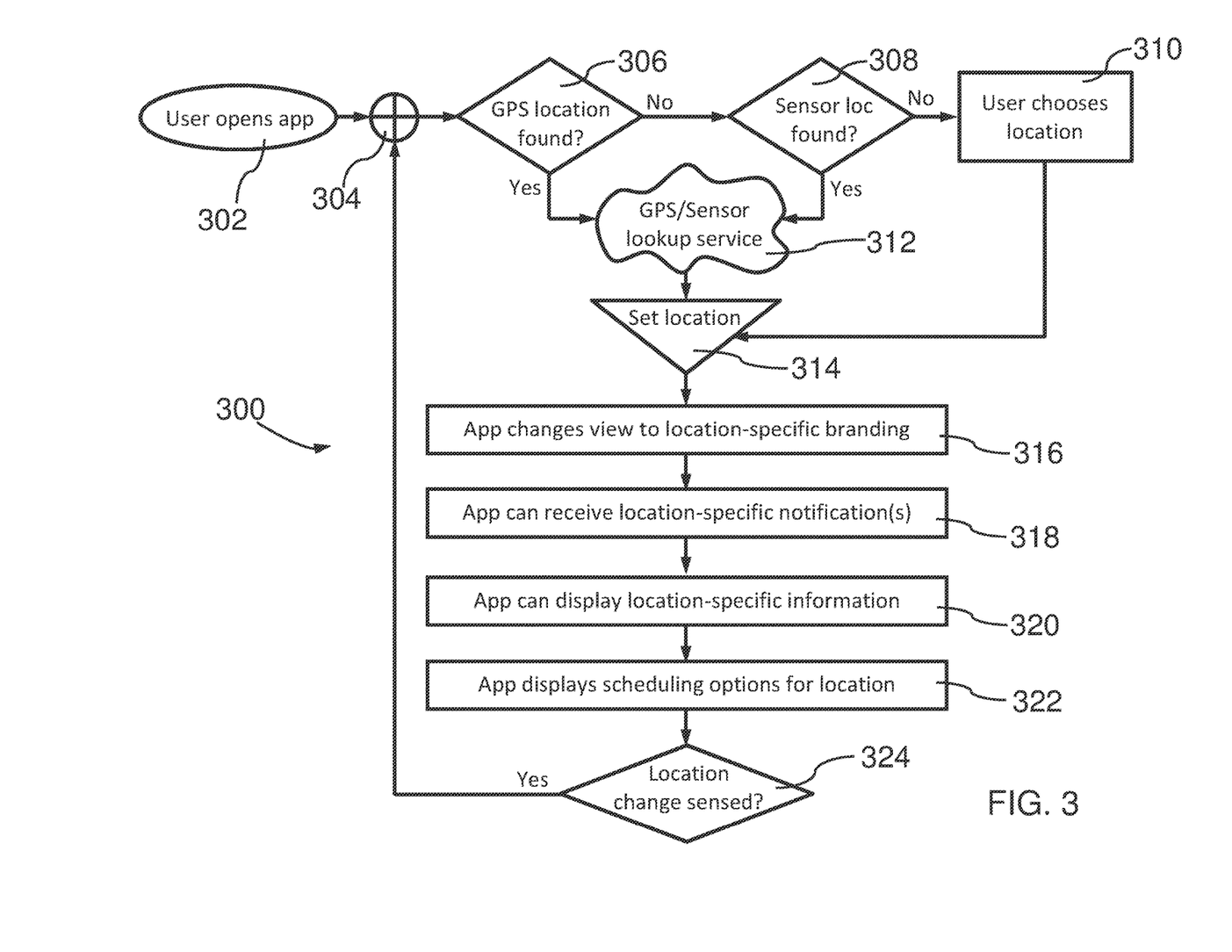
FIG. 3 shows a flowchart of the operation of a portable communications device comprising embodiments of the invention illustrating various possible functions.

FIG. 3 shows a flowchart 300 of the operation of an application according to embodiments of the invention. In block 302, the user first opens the application ("app") on their portable communications device, such as 102 in FIG. 1 or 206 in FIG. 2. The app first determines if a GPS location 306 can be found for the portable communications device—if yes, then there is no need to determine if a location-defining device ("sensor") is nearby, and thus the app immediately branches to an interrogation of the GPS/Sensor lookup service 312. The GPS/Sensor lookup service has pre-defined locational information for various sites applicable to the app, such as for example University campus coordinates (a multiplicity of perimeter coordinates for the campus which would typically cover a large area), or coordinates for individual buildings on campus, or locational information for individual location-defining devices on campus (since GPS may be unusable within internal building spaces), etc. If a GPS location cannot be found (typically due to interference with the reception of signals from multiple GPS satellites), then an effort is made to find a signal 308 from a local Sensor (location-defining device). If such a signal cannot also be found, then the user may choose a location 310, possibly from a pre-defined list of possible locations displayed on the portable communications device screen.

Thus the location may be set 314 for the application in one of three ways: 1) from a GPS signal, 2) from a local Sensor, or 3) directly (manually) by the user. Once the location has been set, blocks 316-322 perform various functions based on the set location from block 314. Block 316 may change the screen display ("view") to correspond to the set location—for example as in FIG. 1, to a Stanford University color scheme and logo. Next block 318 may display various location-specific notifications—for example, the time of the next Stanford home football game—this received information would then be displayed for the user in block 320. In the case of a classroom or exhibit hall location, block 322 might display the next few activities scheduled for that space and their times and availability (e.g., are all tickets sold out for the next Stanford theater production which starts 2 hours from now?).

Following execution of the location-triggered actions in blocks 316-322, block 324 senses if the location has changed (e.g., the user may be walking the halls of a classroom building, wherein block 308 is repetitively reading locational information from sensors at each classroom door). Once a change in location is sensed in block 324, combination block 304 triggers block 306 and possibly block 308 to look for new GPS coordinates and possibly a new Sensor location and the cycle repeats.

Figure 4:
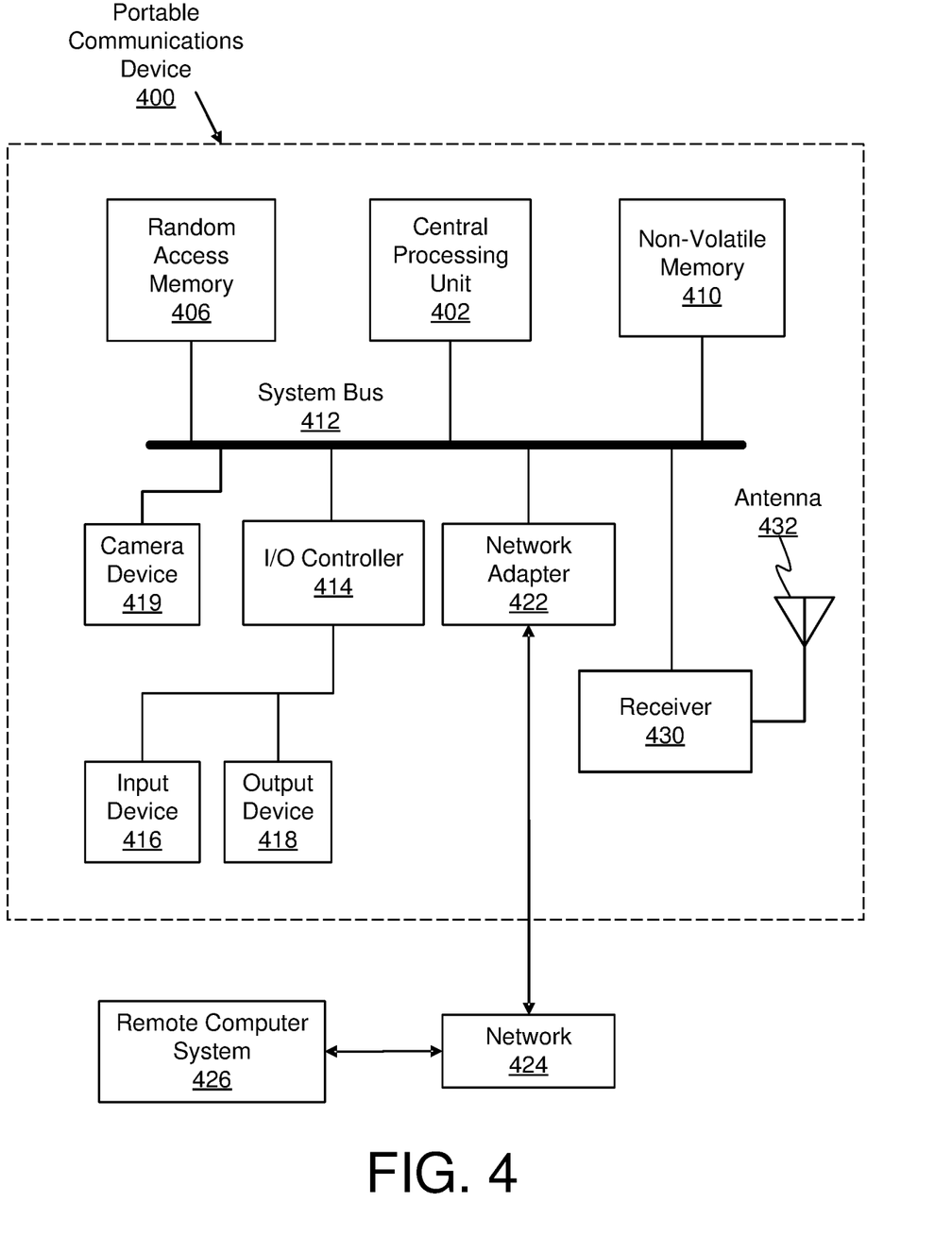
FIG. 4 shows a block diagram of portable communications device 400 suitable for storing and/or executing a computer program product in accordance with embodiments of the present invention.

At least one embodiment of the present invention is directed to a computer program product encoded in a non-transitory, computer-readable medium. The computer program product comprises computer-executable instructions that, when executed, causes one or more computer systems to perform embodiments of the present invention, such as, but not limited to, the method shown in FIG. 3. Turning now to FIG. 4, a block diagram is shown of portable communications device 400 suitable for storing and/or executing a computer program product in accordance with embodiments of the present invention. Portable communications device 400 is suitable for use as portable communication device 102 and 206. Portable communications device 400 includes a central processing unit 402 having at least one microprocessor. Central processing unit 402 can be coupled directly or indirectly to memory elements through system bus 412. The memory elements comprise non-transitory computer-readable media capable of storing computer-executable instructions. The memory elements can include random access memory 406 employed during the actual execution of the program code and non-volatile memory 410 for longer term storage of data and instructions. One or more input devices 416 and output devices 418 can be coupled to system bus 412 either directly or through an intervening I/O controller 414. Examples of input device 416 include, but are not limited to, a pointing device, such as a mouse or a trackpad, or a keyboard. Examples of output device 418 include, but are not limited to, a display screen or a printer. In a preferred embodiment, input device 416 and output device 418 are combined into a single device comprising a touchscreen comprising a display screen (for displaying information to the user of portable communication device 400) having a touch-sensitive surface (for receiving input from the user). Camera 419 can be coupled to system bus 412. Camera 419 can include a lens and an imagine sensor. Camera 419 is capable of capturing and recording digital images and/or videos and storing the digital images/videos to files in non-volatile memory 410. The digital image/video files can include metadata (e.g., geotags) that identify the location of portable communications device 400 at the time the digital image was captured. The metadata can be used as an indication of the location of the subject matter included in the digital image. Geotags are included, for example, in the Exchangeable image file format (Exif) specification of the Japan Electronic Industries Development Association (JEIDA). Network adapters 422 may also be coupled to portable communications device 400 to enable the system to become coupled to remote computer system 426 or remote printers or storage devices through intervening private or public networks 424. Modems, cable modems, Ethernet cards, and wireless network adapters are just a few of the currently available types of network adapters. In a preferred embodiment, portable communications device 400 includes one or more receivers 430. Receiver 430 receives wireless signals via antenna 432. Receiver 430 is adapted for receiving location information from a location-defining device 120 or GPS system 114. Receiver 430 can comprise a transceiver capable of both transmitting and receiving wireless signals. While various component devices of portable communications device 400 are shown as separate devices in FIG. 4 for purposes of demonstration, various component devices may be integrated into a single device as is known in the art, such as in a system-on-a-chip (SoC) device.

Figure 5:
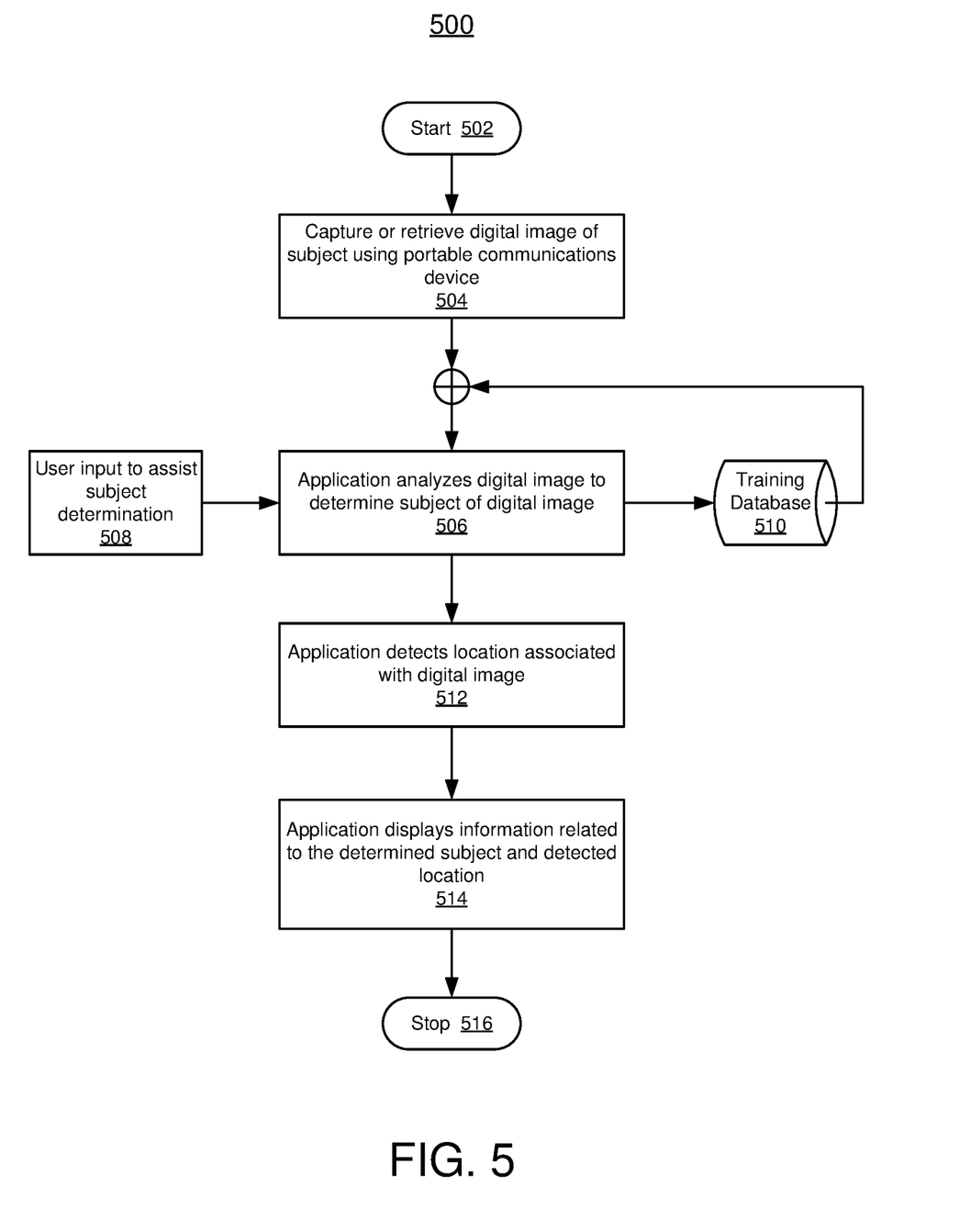
FIG. 5 shows a flowchart of the operation of a portable communications device comprising alternative embodiments of the invention illustrating various possible functions.

FIG. 5 shows a flowchart of the operation of a portable communications device comprising alternative embodiments of the invention illustrating various possible functions. The process begins at step 502. At step 504, the portable communications device captures or retrieves a digital image of a subject. The portable communications device can capture the digital image using a camera integrated into the portable communications device (e.g., a camera on a smartphone). Alternatively, the portable communications device can retrieve a previously recorded digital image using any known means for receiving digital files (e.g, reading from non-volatile memory, receiving by way of data transmission, etc.). The subject can be any object in the field of view of the camera or in the previously recorded digital image for which the user would like to receive information. The information can include location-based information associated with the subject.

Figure 6A:
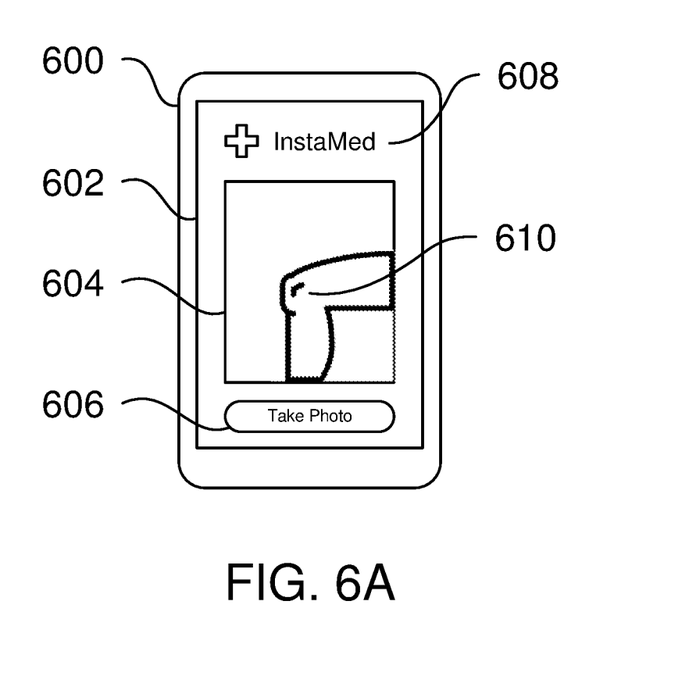
FIGS. 6A-6E show an exemplary portable communications device 600 and an exemplary application 602 demonstrating an exemplary embodiment of the flowchart shown in FIG. 5.

FIGS. 6A-6E show an exemplary portable communications device 600 and an exemplary application 602 demonstrating an exemplary embodiment of the flowchart shown in FIG. 5. FIG. 6A shows an exemplary embodiment of a health care related application 602 executing on portable communications device 600, the application showing an exemplary user interface of the process of FIG. 500 at step 504. Application 602 can include branding information 608. Branding information 608 can comprise branding information related to the developer or publisher of application 602. Application 602 can include a camera window 604 that displays a digital image obtained from a camera sensor of a digital camera integrated into portable communications device 600 (e.g., the camera on a smartphone device). Application 602 can include virtual camera shutter release button 606 that enables the user to capture the digital image shown in camera window 604, for example, by touching a touchscreen display of portable communications device 600 in the area where virtual camera shutter release button 606 is shown on the touchscreen display.

At step 506, the application analyzes the digital image to determine the subject 610 of the digital image. For example, the application can use image recognition (e.g, deep learning for computer vision, etc.) to determine subject of the digital image. If the application needs assistance determining the subject 610 of the digital image then, at step 508, the application can prompt the user for input to assist in determining the intended subject 610. For example, the application can prompt the user to select from several subject choices determined by the application or the application can prompt the user to select a portion of the displayed image to narrow the possible range of subjects. At step 510, the input received from the user can be saved in training database 510 to assist with future subject determinations using machine learning techniques. Steps 506, 508, and 510 can repeat recursively until the user's intended subject 610 is properly identified. If the application does not need assistance determining the subject 610 of the digital image, then the process can proceed to step 512 without requesting user in put at step 508.

Figure 6B:
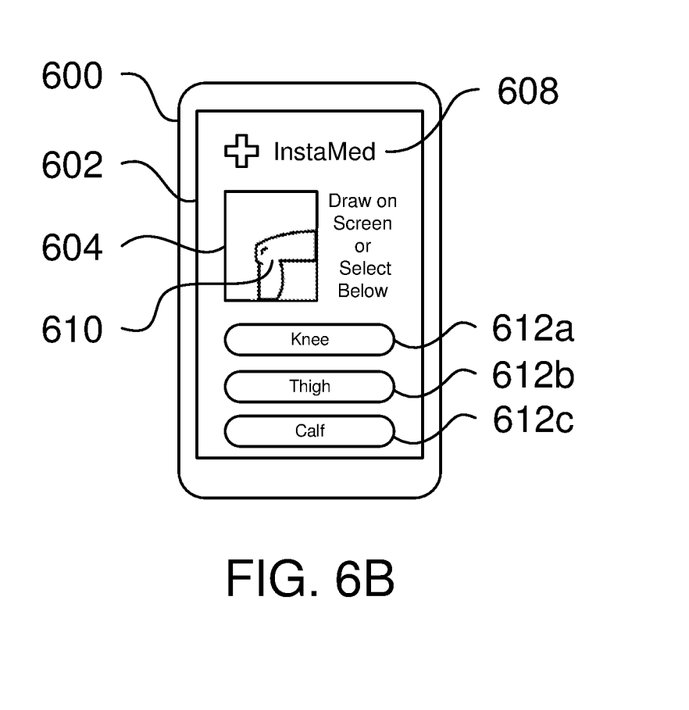

FIG. 6B shows an exemplary user interface of application 602 at steps 506 and 508. Application 602 can include image window 604 that displays the digital image under analysis to the user. In this example, application 602 needs assistance determining the subject 610 of the digital image. Application 602 prompts the user for input to assist in determining the intended subject 610. Application 602 prompts the user to select from several subject choices 612*a-c* determined by the application to be appropriate for the image shown in image window 604. In this example, application 602 determines that the subject 610 of the image in image window 604 is likely a knee, thigh, or calf and prompts the user to select user interface element 612*a* if the intended subject is a knee, user interface elements 612*b* if the intended subject is a thigh, or user interface element 612*c* if the intended subject is a calf. In case none of these choices fits the intended subject, the application can also prompt the user to select a portion of the displayed image to narrow the possible range of subjects. The user can select a portion of the image that is relevant to the user's inquiry (e.g., using a finger on a touchscreen to draw an approximate boundary around the portion of the image relevant to the intended subject).

At step 512, the application detects a location associated with the digital image using a location-defining device. The location associated with the subject can be determined by application 602 by obtaining GPS or other location data available from portable communications device 600. The location associated with the subject can also be determined from metadata (e.g., geotags) encoded in or associated with the digital image that identify the location of the portable communications device when the digital image was captured. The metadata can be used as an indication of the location of the subject matter included in the digital image. Geotags are included, for example, in the Exchangeable image file format (Exif) specification of the Japan Electronic Industries Development Association (JEIDA).

Figure 6C:
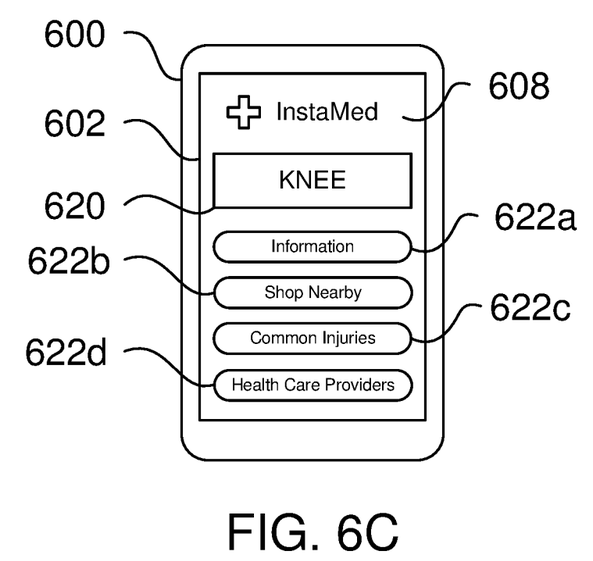

At step 514, the application displays information related to the determined subject and the detected location. FIG. 6C shows an exemplary user interface of application 602 at step 514. Application 602 can include subject identifier 620 that displays an indication of the subject of the digital image to the user. User interface elements 622*a-d* enable to the user to access instructive or other information related to identified subject of the digital image. In this example, the identified subject 610 is a knee. User interface element 622*a* can be selected by the user to access instructive or other information related to knees. User interface element 622*b* can be selected by the user to access shopping information for knee-related products in proximity to the detected location. User interface element 622*c* can be selected by the user to access information for common knee-related injuries. User interface element 622*d* can be selected by the user to access contact information for health care providers who specialize in treating knees, and who are in proximity to the detected location.

Figure 6D:
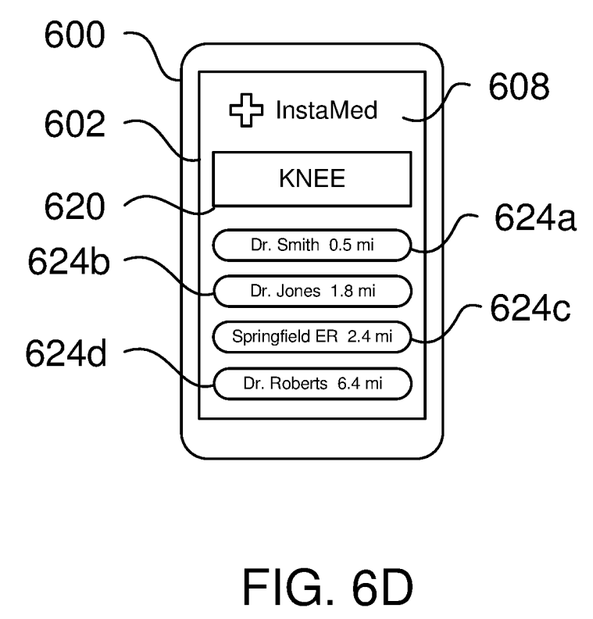

In the present example, the user can select user interface element 622*d* to access a list of health care providers who specialize in treating knees and their proximity to the detected location. Application 602 can display the exemplary user interface shown in FIG. 6D. The exemplary user interface in FIG. 6D shows a list of health care providers who specialize in treating knees and their proximity to the detected location. User interface elements 624*a-d* can include a name for each health care provider and an indication of proximity of the health care provider to the detected location. The user can select any of user interface elements 624*a-d* to obtain more information about the health care provider, including contact information.

Figure 6E:
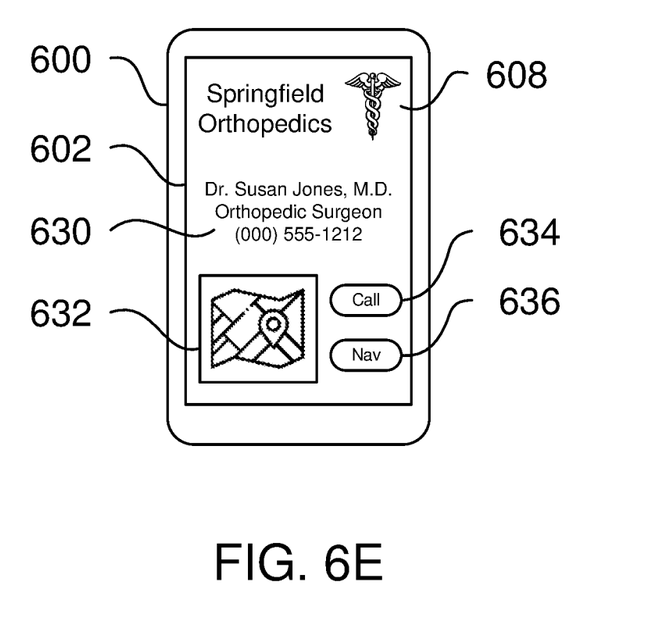

The exemplary user interface in FIG. 6E shows detailed information for the health care provider selected by using user interface elements 624*a-d*. In the present example, the selected health care provider is Dr. Susan Jones, M.D. Application 602 can display contact information 630 relating to Dr. Jones. Application 602 can adapt branding information 608 to show branding information relating the Dr. Jones' practice group (e.g., "Springfield Orthopedics"). Application 602 can display map 632 showing the location of Dr. Jones' office. Application 602 can include user interface element 634 that, when selected by the user, causes portable communications device 600 to place a call to the phone number associated with Dr. Jones. Application 602 can include user interface element 636 that, when selected by the user, causes portable communications device 600 to open a mapping/navigation application (e.g., Google Maps, Apple Maps, Waze, Here We Go, etc.) to assist the user with directions to Dr. Jones' office. The process stops at step 516.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for changing the appearance and/or functionality of a location-aware application on a portable communication device, the method comprising the steps of:
    capturing or retrieving a digital image that includes a plurality of objects using a portable communications device;
    analyzing the digital image to identify the plurality of objects in the digital image using a computer vision technique that includes deep learning for identifying objects;
    presenting a plurality of subject choices based on the identified plurality of objects;
    receiving a selection of a subject from the presented plurality of subject choices;
    detecting a location associated with the digital image;
    retrieving information related to both the selected subject and the detected location associated with the digital image; and
    displaying the retrieved information.

2. The method of claim 1, wherein detecting a location associated with the digital image further comprises detecting the location associated with the digital image based on metadata associated with the digital image.

3. The method of claim 2, wherein the metadata associated with the digital image includes GPS coordinates.

4. The method of claim 1, wherein detecting a location associated with the digital image further comprises using computer-based image recognition of the digital image.

5. The method of claim 4, wherein computer-based image recognition further comprises deep learning for computer vision.

6. A non-transitory computer-readable medium having computer-executable instructions stored thereon that, in response to execution by one or more processors of a computing device, cause the computing device to perform actions for changing the appearance and/or functionality of a location-aware application on a portable communication device, the actions comprising:
    capturing or retrieving a digital image that includes a plurality of objects using a portable communications device;
    analyzing the digital image to identify the plurality of objects in the digital image using a computer vision technique that includes deep learning for identifying object;
    presenting a plurality of subject choices based on the identified plurality of objects;
    receiving a selection of a subject from the presented plurality of subject choices;
    detecting a location associated with the digital image;
    retrieving information related to both the selected subject and the detected location associated with the digital image; and
    displaying the retrieved information.

7. The non-transitory computer-readable medium of claim 6, wherein detecting a location associated with the digital image further comprises detecting the location associated with the digital image based on metadata associated with the digital image.

8. The non-transitory computer-readable medium of claim 7, wherein the metadata associated with the digital image includes GPS coordinates.

9. The non-transitory computer-readable medium of claim 6, wherein detecting a location associated with the digital image further comprises using computer-based image recognition of the digital image.

10. The non-transitory computer-readable medium of claim 9, wherein computer-based image recognition further comprises deep learning for computer vision.

11. A computing device, comprising:
    at least one processor; and
    a non-transitory computer-readable medium having computer-executable instructions stored thereon that, in response to execution by the at least one processor, cause the computing device to perform actions for changing the appearance and/or functionality of a location-aware application on a portable communication device, the actions comprising:
        capturing or retrieving a digital image that includes a plurality of objects using a portable communications device;
        analyzing the digital image to identify the plurality of objects in the digital image using a computer vision technique that includes deep learning for identifying objects;
        presenting a plurality of subject choices based on the identified plurality of objects;
        receiving a selection of a subject from the presented plurality of subject choices;
        detecting a location associated with the digital image;

retrieving information related to both the selected subject and the detected location associated with the digital image; and displaying the retrieved information.

12. The computing device of claim 11, wherein detecting a location associated with the digital image further comprises detecting the location associated with the digital image based on metadata associated with the digital image.

13. The computing device of claim 12, wherein the metadata associated with the digital image includes GPS coordinates.

14. The computing device of claim 11, wherein detecting a location associated with the digital image further comprises using computer-based image recognition of the digital image.

15. The computing device of claim 14, wherein computer-based image recognition further comprises deep learning for computer vision.

\* \* \* \* \*